US012594604B2

(12) United States Patent
Seo et al.

(10) Patent No.: US 12,594,604 B2
(45) Date of Patent: Apr. 7, 2026

(54) POWDER SUPPLY MANAGEMENT SYSTEM FOR LASER FORMING DEVICE

(71) Applicant: INSSTEK, INC., Daejeon (KR)

(72) Inventors: Suk Hyun Seo, Daejeon (KR); Won Hoe Kim, Daejeon (KR); Seon Ju Lee, Daejeon (KR)

(73) Assignee: INSSTEK, INC., Daejeon (KR)

( * ) Notice: Subject to any disclaimer, the term of this patent is extended or adjusted under 35 U.S.C. 154(b) by 350 days.

(21) Appl. No.: 18/277,325

(22) PCT Filed: Feb. 17, 2022

(86) PCT No.: PCT/KR2022/002323
§ 371 (c)(1),
(2) Date: Aug. 15, 2023

(87) PCT Pub. No.: WO2022/177308
PCT Pub. Date: Aug. 25, 2022

(65) Prior Publication Data
US 2024/0123507 A1 Apr. 18, 2024

(30) Foreign Application Priority Data

Feb. 19, 2021 (KR) ........................ 10-2021-0022378

(51) Int. Cl.
*B22F 12/52* (2021.01)
*B22F 10/34* (2021.01)
(Continued)

(52) U.S. Cl.
CPC .............. *B22F 12/52* (2021.01); *B22F 10/34* (2021.01); *B22F 12/57* (2021.01); *B33Y 30/00* (2014.12); *B33Y 40/00* (2014.12)

(58) Field of Classification Search
None
See application file for complete search history.

(56) References Cited

U.S. PATENT DOCUMENTS 2,030,541 A * 2/1936 Rose ...................... G01F 13/001
222/311
4,133,453 A * 1/1979 Ohbora .................. G01F 23/263
73/304 C
(Continued)

FOREIGN PATENT DOCUMENTS

JP H07-085871 A 3/1995
JP H08-066660 A 3/1996
(Continued)

OTHER PUBLICATIONS

International Search Report for PCT/KR2022/002323 mailed Jun. 2, 2022 from Korean Intellectual Property Office.
(Continued)

*Primary Examiner* — Alexandra M Moore
(74) *Attorney, Agent, or Firm* — Paratus Law Group, PLLC

(57) ABSTRACT

A powder supply management system for a laser forming device, includes: a hopper for discharging powder; a main sampling unit which guides a portion of the powder discharged from the hopper to the laser forming device and guides the remaining powder to be discharged to another location; and a discharge monitoring unit which calculates an amount of the remaining powder separated in the main sampling unit.

5 Claims, 7 Drawing Sheets

(51) Int. Cl.
    *B22F 12/57*       (2021.01)
    *B33Y 30/00*       (2015.01)
    *B33Y 40/00*       (2020.01)

(56)            References Cited

U.S. PATENT DOCUMENTS

| | | | | |
|---|---|---|---|---|
| 5,309,773 | A | * | 5/1994 | Tokoyama ................ B04C 5/14 |
| | | | | 250/222.2 |
| 2001/0045678 | A1 | * | 11/2001 | Kubo ...................... B29C 64/35 |
| | | | | 425/375 |
| 2014/0348969 | A1 | * | 11/2014 | Scott ...................... B33Y 10/00 |
| | | | | 425/166 |

FOREIGN PATENT DOCUMENTS

| | | | | |
|---|---|---|---|---|
| JP | 2011-185691 | A | 9/2011 | |
| KR | 10-2011-0134393 | A | 12/2011 | |
| KR | 10-2016-0124710 | A | 10/2016 | |
| KR | 10-2017-0097420 | A | 8/2017 | |
| WO | WO-9534468 | A1 * | 12/1995 | ........... B29C 64/357 |

OTHER PUBLICATIONS

Korean Office Action for related KR Application No. 10-2021-0022378 mailed Oct. 20, 2021 from Korean Intellectual Property Office.
Korean Office Action for related KR Application No. 10-2021-0022378 mailed Feb. 11, 2022 from Korean Intellectual Property Office.
Dongming Hu et al., "Sensing, modeling and control for laser-based additive manufacturing", International Journal of Machine Tools and Manufacture, 2003, pp. 51-60, vol. 43, No. 1.

\* cited by examiner

211

10, 20—3

211

2

10, 20    3

2

POWDER SUPPLY MANAGEMENT SYSTEM FOR LASER FORMING DEVICE

CROSS-REFERENCE TO PRIOR APPLICATIONS

This Application is a National Stage Patent Application of PCT International Application No. PCT/KR2022/002323 (filed on Feb. 17, 2022), which claims priority to Korean Patent Application No. 10-2021-0022378 (filed on Feb. 19, 2021), which are all hereby incorporated by reference in their entirety.

BACKGROUND

The present disclosure relates to a powder supply management system for a laser forming device, and more particularly, to a powder supply management system, for a laser forming device, which manages powder supply so that powder of the amount required for laser forming can be constantly supplied.

The technology disclosed in the present specification relates to a powder supply management system for a laser forming device, and typically includes laser-aided direct metal manufacturing. The laser-aided direct metal manufacturing technology can manufacture a 3-dimensional product or a tool necessary for manufacturing the product in a very short time using a laser cladding technology that uses functional materials (metals, alloys, ceramics, etc.) and precisely welds them directly with a laser according to digital data of 3D subjects stored in a computer. The digital data of 3D subjects includes 3D CAD data, medical CT (Computer Tomography) and MRI (Magnetic Resonance Imaging) data, and digital data measured by a 3D scanner (3D Object Digitizing System). The tool refers to a mass-production mold required for product production such as dies or molds. Such a technology can produce metal proto-types, mass-production molds, final products with complex shapes, and various tools in a short time incomparable to conventional processing methods, such as cutting and cast-ing, using CNC (Computerized Numerical Control) and other processing machines, and can be applied to restoration, remodeling, and repairing of molds using reverse engineer-ing. The basic concept of creating the physical shape based on CAD data is similar to that of a general printer. As the printer produces a document by applying ink to a precise location on a two-dimensional paper plane using document data files stored in a computer, the laser-aided direct metal manufacturing technology creates a 3D physical shape by forming functional material of a required amount at an exact location in a 3D space using 3D CAD data. This technology is being developed as a 3D printer, and has recently been commercialized in different directions depending on the characteristics of materials such as plastic, ceramic, paper, and metal. In the laser-aided direct metal manufacturing technology, a two-dimensional plane is physically imple-mented using a laser cladding technology.

Korean Patent Application Publication No. 10-2017-0097420 (published on Aug. 28, 2017, "Amorphous metal manufacturing apparatus using a 3D metal printer and amorphous metal produced thereby") discloses a laser irra-diation unit for irradiating a laser beam to a specimen to generate a molten pool, a powder supply unit for supplying metal powder to the generated molten pool, a control unit for controlling movement of the laser irradiation unit in response to 3D CAD data and a thickness of the metal melt in which the metal powder is melted, and a cooling unit for rapidly cooling the metal melt into amorphous metal. The amorphous metal manufacturing apparatus using the 3D metal printer may further include a photographing unit for capturing an image of the molten metal, and an image analyzing unit for measuring a thickness of the molten metal by analyzing the captured image. The control unit may calculate a tool path based on the 3D CAD data, and move the laser irradiation unit along the calculated tool path when the thickness of the metal melt reaches a preset thickness. The cooling unit may quench the molten metal melt along the tool path to the amorphous metal of the preset thickness using an inert gas. The metal powder may include one or more of Ni, Ce, La, Gd, Mg, Y, Sm, Zr, Fe, Ti, Co, Al, Cu, Mo, Sn, Nb, and Si. The amorphous metal manufacturing apparatus using the 3D metal printer may further include a laser oscillation unit for oscillating the laser beam, and a laser focusing unit for focusing the oscillated laser beam. The laser irradiation unit may irradiate the focused laser beam to the specimen. The control unit may control the movement of the laser irradiation unit to maintain the focal length of the laser beam while the laser irradiation unit irradiates the laser beam. The control unit may control an ejection speed of the metal powder supplied from the powder supply unit in response to a moving speed of the laser irradiation unit. According to the present disclosure, a technology in which the amorphous metal can be manufac-tured by the amorphous metal manufacturing apparatus using the three-dimensional metal printer is disclosed.

The powder needs to be controlled together with the laser irradiation unit in the conventional technology. Representa-tively, Korean Patent Application Publication No. 10-2016-0124710 (published on Oct. 28, 2016, "Trough device for vibrating feeder") discloses a trough device for vibrating feeder which moves raw materials supplied by a vibrating feeder for large and small supply and a vibrating feeder for large supply installed in front of the vibrating feeder for large and small supply forward to be introduced in a metering unit. The trough device for vibrating feeder includes: a supply unit having a first bottom portion with a lower surface seated on an upper surface of the vibrating feeder for large and small feed, a first left side wall with a bottom end coupled with a left end of the first bottom portion, a first right side wall with a bottom end coupled with a right end of the first bottom portion, and a first rear wall with a bottom end coupled with a rear end of the first bottom portion, wherein an interior space is surrounded by the first bottom portion, the first left side wall, the first right side wall, and the first rear wall, and front and upper sides are open; a trough for large and small supply coupled with a front end of the first bottom portion and extended in a forward direction and having a width contraction part in which a rear end is coupled with a front end of the supply unit and left and right edges gradually approach the center in a left-right direction to make a left and right width narrowed as it goes forward, and a small supply transfer part having a rear end coupled with a front end of the width contraction part and extending forward while maintaining a constant left-right width; and a trough for large supply, located below the trough for large and small supply, having a second bottom portion with a lower surface seated on an upper surface of the vibrating feeder for large supply, a second left side wall with a bottom end coupled with a left end of the second bottom portion, a second right side wall with a bottom end coupled with a right end of the second bottom portion, and a second rear wall with a bottom end coupled with a rear end of the second bottom portion, wherein an interior space is surrounded by the second bottom portion, the second left side wall, the second right side wall, and the second rear wall, and front and upper sides are open to receive the raw material flowing down from the left edge and the right edge of the width contraction part and discharge the raw material to the metering unit through the front edge of the second bottom portion, wherein the front end of the small supply transfer part is located in front of the front end of the second bottom portion.

In addition, Korean Patent Application Publication No. 10-2016-0124710 (published on Oct. 28, 2016, "Trough apparatus for vibrating feeder") discloses a technology in which the vibrating feeder used in a forming device such as a 3D printer moves a feed object (powder, etc.) supplied through an object supply device to the outside through vibration so that the feed object spreads evenly, and the amount discharged to the outside depending on the movement speed of the moving object is constant.

SUMMARY

In a conventional laser forming device, there is a problem that a required amount of powder is not uniformly supplied to the laser forming device due to various reasons in the process of supplying powder from a feeder storing the powder to the laser forming device, which causes defective products, and as a result, the presence or absence of defective products is determined in a separate process.

Accordingly, the technology disclosed in the present specification provides a powder supply management system for a laser forming device which is capable of managing the flow of powder supplied from a hopper to the laser forming device to determine whether a formed product is defective or not in advance.

In one embodiment, a powder supply management system for a laser forming device is disclosed.

The powder supply management system for the laser forming device disclosed in the present specification, comprises: a hopper 100 for discharging powder; a main sampling unit 200 which guides a portion of the powder discharged from the hopper 100 to the laser forming device 1 and guides the remaining powder to be discharged to another location; and a discharge monitoring unit 300 which calculates an amount of the remaining powder separated in the main sampling unit 200.

The powder supply management system for the laser forming device disclosed in the present specification, may optionally further comprise a sub-sampling unit 400 which guides a portion of the powder discharged to the monitoring unit 300 from the main sampling unit 200 to be discharged to the monitoring unit 300 and guides the remaining powder to the laser forming device 1.

The powder supply management system for the laser forming device disclosed in the present specification, may optionally further comprise a storage monitoring unit 500 which captures an image of a state of the powder stored in the hopper 100.

The main sampling unit 200 of the powder supply management system for the laser forming device disclosed in the present specification, may include: a main slitter unit 210 connected to the hopper 100 to divide the powder discharged from the hopper 100; a first main guide tube 220 connected to one side of the main slitter unit 210 to guide the divided powder to the laser forming device 1; and a second main guide tube 230 connected to the other side of the main slitter unit 210 to guide the remainder of the divided powder to the discharge monitoring unit 300.

The main slitter unit 210 of the powder supply management system for the laser forming device disclosed in the present specification, may include: a pair of slitters having one slitter 211 separated from each other to provide a first passage space 10 and another slitter 211 positioned on one side of the slitter 211 to provide a second passage space 20, one sides of the first passage space 10 and the second passage space being connected to each other and the other sides thereof being separated in different directions; and a slitter guide 212 provided to cover a side surface of the slitter 211 so that the powder moves to the first passage space 10 and the second passage space 20.

The first passage space 10 and the second passage space 20 provided by the pair of slitters 211 separated from each other, in the powder supply management system for the laser forming device disclosed in the present specification, may include a vertical space 2 in a vertical direction, and a transverse space 3 connected to the vertical space 2 and inclined in a transverse direction.

The sub-sampling unit 400 of the powder supply management system for the laser forming device disclosed in the present specification, may include: a sub-slitter unit 410 connected to the main sampling unit 200 to divide the powder guided to the discharge monitoring unit 300; a first sub-guide tube 420 connected to one side of the sub-slitter unit 410 to guide the divided power to the laser forming device 1; and a second sub-guide tube 430 connected to the other side of the sub-slitter unit 410 to guide the remainder of the divided powder to the discharge monitoring unit 300.

The powder supply management system for the laser forming device disclosed herein samples a portion of the powder supplied to the forming apparatus 1 from the hopper 100 through the main slitter portion 200 and determines presence or absence of the required amount through the discharge monitoring unit 300, so that the powder supply management system for the laser forming device can enable an operator to manage the flow of powder supplied to the laser forming device 1 from the hopper 100 to determine the presence or absence of defective product.

The foregoing contents provide only optional concepts in a simplified form of the matters described in more detail hereinafter. The contents are not intended to limit the principal or essential features of the claims, or to limit the scope of the claims.

DETAILED DESCRIPTION

Figure 1:
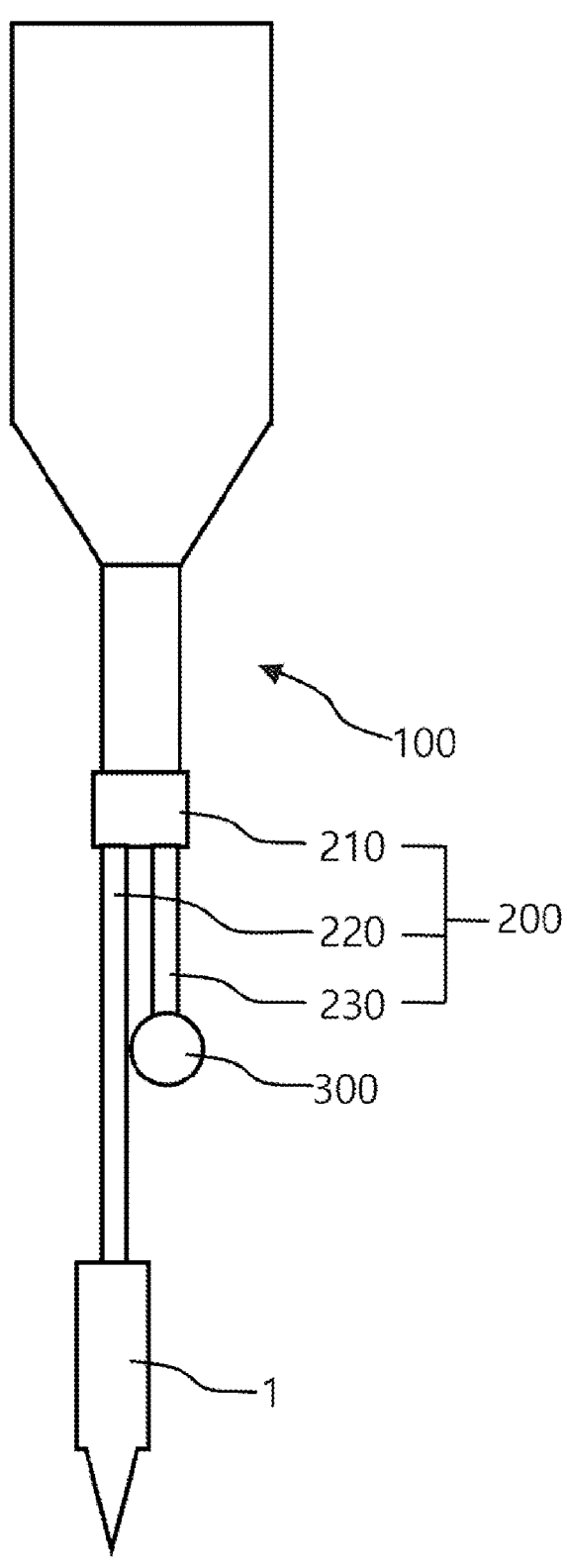
FIG. 1 is a drawing illustrating one embodiment of the technology disclosed in the present specification.

Hereinafter, embodiments disclosed in the present specification will be described in detail with reference to the drawings. Unless otherwise indicated herein, like reference numerals in the drawings refer to like components. The exemplary embodiments set forth in the detailed description, drawings, and claims are not intended to limit the present disclosure, and other embodiments may be utilized and other modifications may be made without departing from the idea or scope of the technology disclosed herein. Those skilled in the art will readily understand that the components of the present disclosure, i.e., those generally described herein and illustrated in the drawings, may be arranged, configured, combined, and designed in various other configurations, and all of which are expressly devised and form part of the present disclosure. The widths, lengths, thicknesses, or shapes of the components may be exaggerated in order to clearly show the various layers (or membranes), areas, and shapes in the drawings.

When a component is referred to as being "arranged" in another component, this may include not only cases where the component is directly arranged in the other component, but also cases where additional components are interposed between them.

When a component is referred to as being "provided" to another component, this may include not only cases where the component is directly provided to the other component, but also cases where additional components are interposed between them.

The description of the disclosed technology is for structural and functional illustrative purposes only, and the scope of the disclosed technology should not be construed to be limited by the embodiments described herein. In other words, the embodiments are subject to various modifications and may take many forms, so the scope of the disclosed technology should be understood to include equivalents capable of realizing the technical ideas.

Expressions in the singular are to be understood to include the plural unless the context clearly indicates otherwise, and terms such as "include" or "have" are intended to specify the presence of the features, numbers, steps, actions, components, parts, or combinations thereof as defined, and not to preclude the possibility of the presence or addition of one or more other features, numbers, steps, actions, components, parts, or combinations thereof.

All terms used herein shall have the same meaning as commonly understood by those skilled in the art to which the disclosed technology pertains, unless otherwise defined. Terms as defined in commonly used dictionaries are to be construed consistent with their contextual meaning in the relevant art and are not to be construed to have an idealized or unduly formal meaning unless expressly defined in the present specification.

Figure 2:
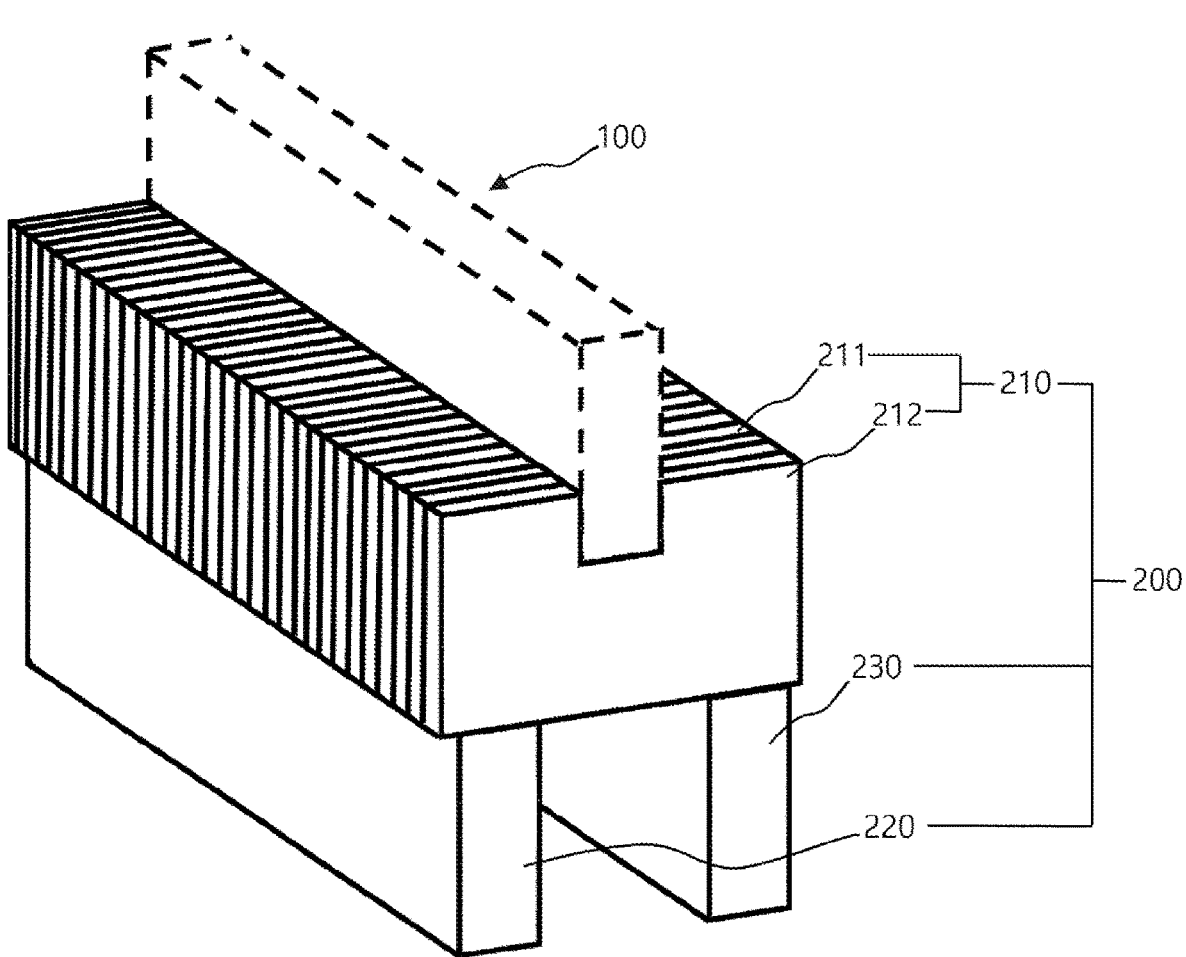
FIG. 2 is a drawing of an example of a main sampling unit disclosed in the present specification.
Figure 3:
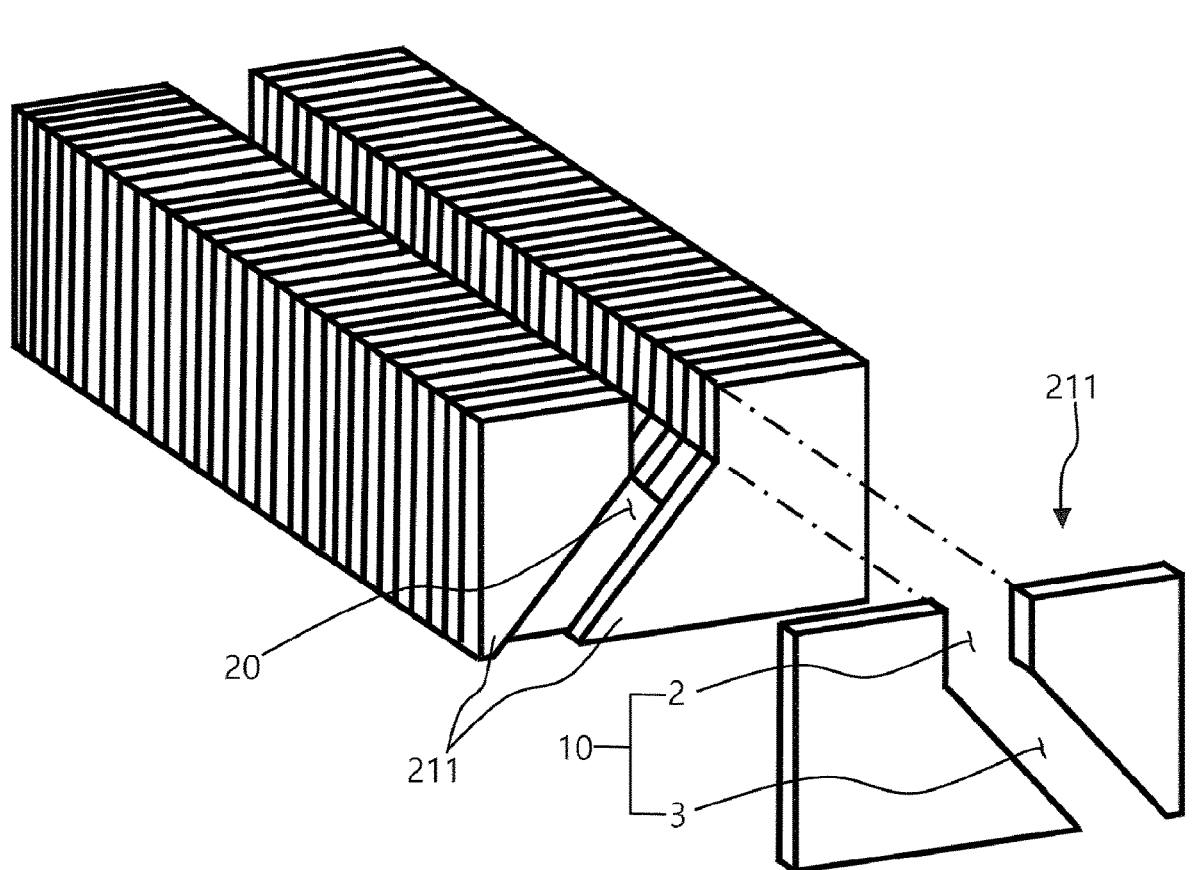
FIG. 3 is an exploded view of an example of a main slitter unit disclosed in FIG. 2.
Figure 4:
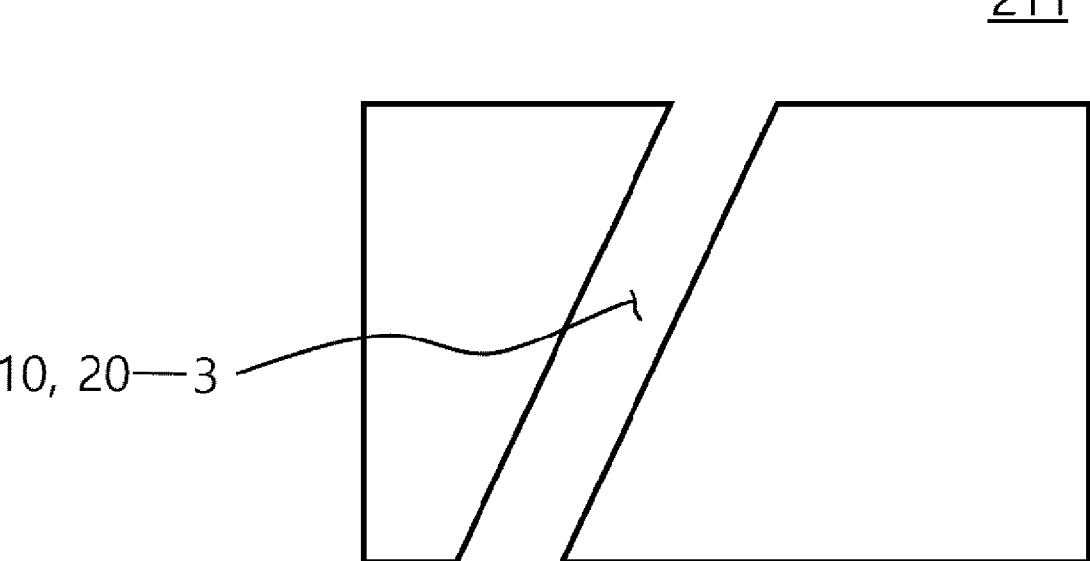
FIG. 4 is an exploded view of another example of the main slitter unit disclosed in FIG. 2.
Figure 5:
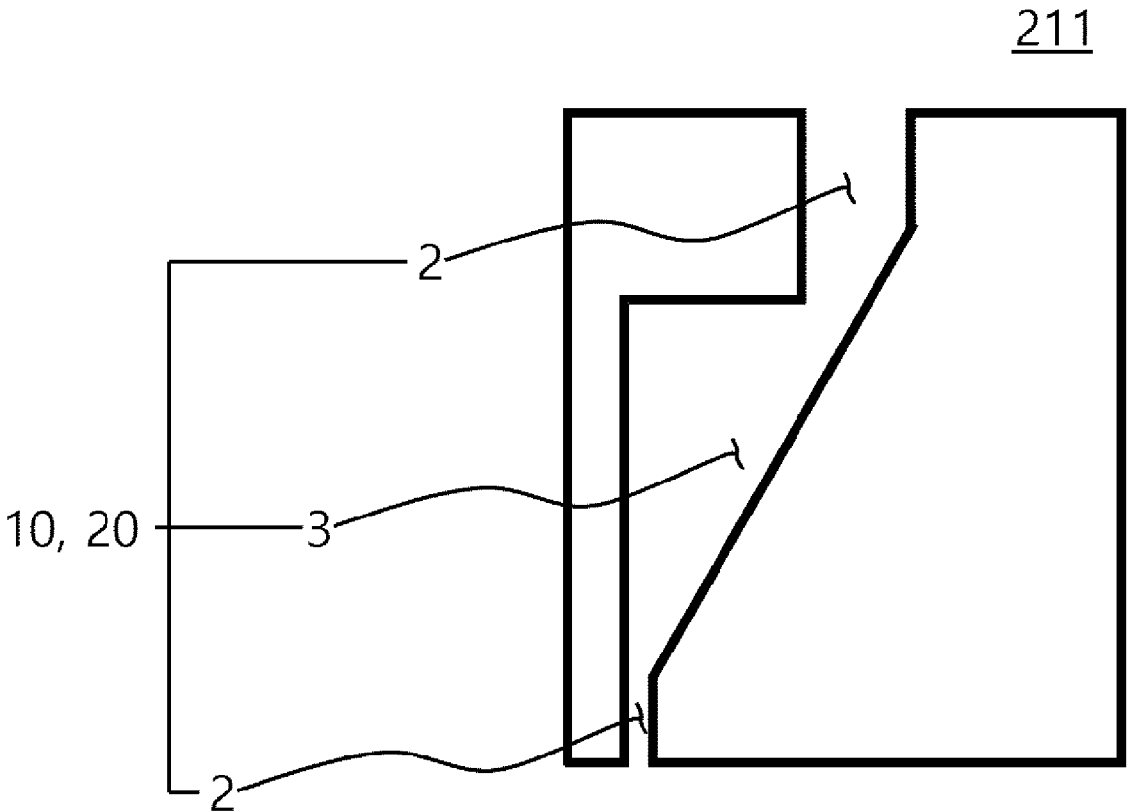
FIG. 5 is an exploded view of still another example of the main slitter unit disclosed in FIG. 2.
Figure 6:
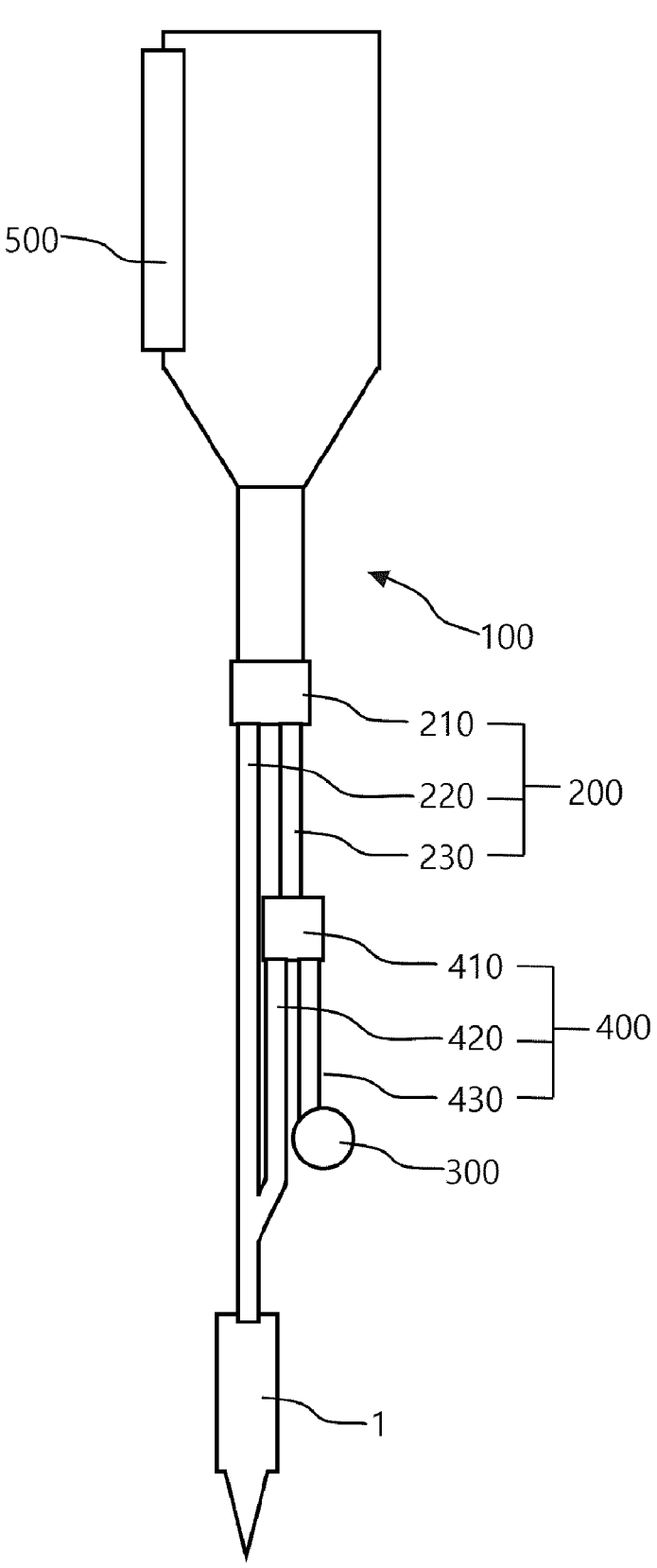
FIG. 6 is an exploded view of another embodiment of the technology disclosed in the present specification.
Figure 7:
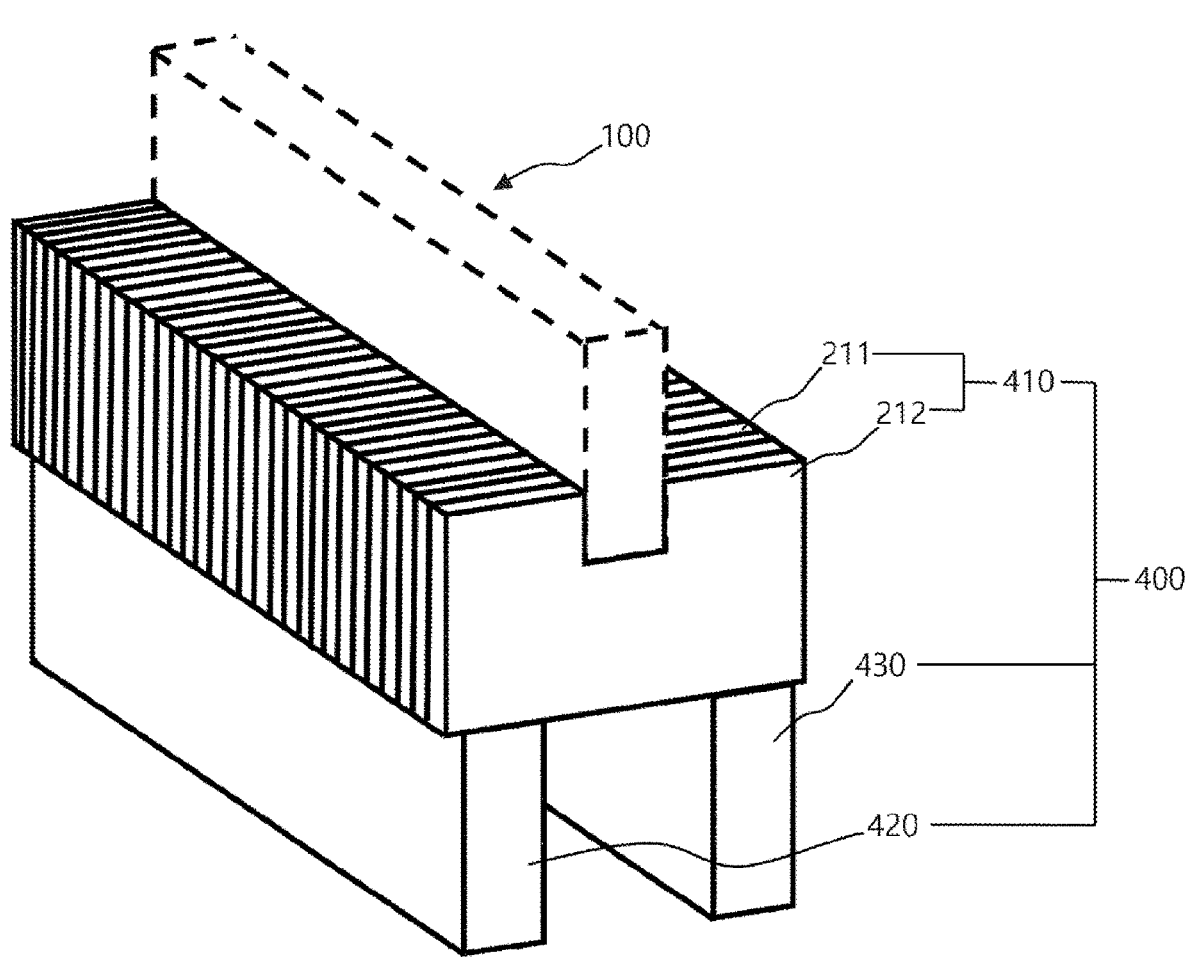
FIG. 7 is an exploded view of another example of a slitter unit disclosed in the present specification.

FIG. 1 is a drawing illustrating one embodiment of the technology disclosed in the present specification. FIG. 2 is a drawing of an example of a main sampling unit disclosed in the present specification. FIG. 3 is an exploded view of an example of a main slitter unit disclosed in FIG. 2. FIG. 4 is an exploded view of another example of the main slitter unit disclosed in FIG. 2. FIG. 5 is an exploded view of still another example of the main slitter unit disclosed in FIG. 2. FIG. 6 is an exploded view of another embodiment of the technology disclosed in the present specification. FIG. 7 is an exploded view of another example of a slitter unit disclosed in the present specification.

The powder supply management system for the laser forming device disclosed in the present specification, includes a hopper 100 for discharging powder, a main sampling unit 200 which guides a portion of the powder discharged from the hopper 100 to the laser forming device 1 and guides the remaining powder to be discharged to another location; and a discharge monitoring unit 300 which calculates an amount of the remaining powder separated in the main sampling unit 200.

The powder supply management system for the laser forming device disclosed in the present specification, may optionally further include a sub-sampling unit 400 which guides a portion of the powder discharged to the monitoring unit 300 from the main sampling unit 200 to be discharged to the monitoring unit 300 and guides the remaining powder to the laser forming device 1.

The powder supply management system for the laser forming device disclosed in the present specification, may optionally further include a storage monitoring unit 500 which captures an image of a state of the powder stored in the hopper 100.

The main sampling unit 200 of the powder supply management system for the laser forming device disclosed in the present specification, may include a main slitter unit 210 connected to the hopper 100 to divide the powder discharged from the hopper 100, a first main guide tube 220 connected to one side of the main slitter unit 210 to guide the divided powder to the laser forming device 1, and a second main guide tube 230 connected to the other side of the main slitter unit 210 to guide the remainder of the divided powder to the discharge monitoring unit 300.

The main slitter unit 210 of the powder supply management system for the laser forming device disclosed in the present specification, may include a pair of slitters having one slitter 211 separated from each other to provide a first passage space 10 and another slitter 211 positioned on one side of the slitter 211 to provide a second passage space 20, one sides of the first passage space 10 and the second passage space being connected to each other and the other sides thereof being separated in different directions; and a slitter guide 212 provided to cover a side surface of the slitter 211 so that the powder moves to the first passage space 10 and the second passage space 20.

The first passage space 10 and the second passage space 20 provided by the pair of slitters 211 separated from each other, in the powder supply management system for the laser forming device disclosed in the present specification, may include a vertical space 2 in a vertical direction, and a transverse space 3 connected to the vertical space 2 and inclined in a transverse direction.

The sub-sampling unit 400 of the powder supply management system for the laser forming device disclosed in the present specification, may include: a sub-slitter unit 410 connected to the main sampling unit 200 to divide the powder guided to the discharge monitoring unit 300; a first sub-guide tube 420 connected to one side of the sub-slitter unit 410 to guide the divided power to the laser forming device 1; and a second sub-guide tube 430 connected to the other side of the sub-slitter unit 410 to guide the remainder of the divided powder to the discharge monitoring unit 300.

Hereinafter, the present disclosure will be described in more detail hereinafter with reference to the accompanying drawings.

Referring to one embodiment illustrated in FIG. 1, the powder supply management system for the laser forming device broadly includes a hopper 100, a main sampling unit 200, and a discharge monitoring unit 300.

The hopper 100 discharges powder. The hopper 100 may include a typical hopper and a typical feeder. The hopper 100 discharges a certain amount of powder required in the forming device 1.

As shown in FIG. 2, the main sampling unit 200 guides a portion of the powder discharged from the hopper 100 to the laser forming device 1, and guides the remaining powder to be discharged to another location. The main sampling unit 200 may broadly include a main slitter unit 210, a first main guide tube 220, and a second main guide tube 230.

The main slitter unit 210 is connected to the hopper 100 to divide the powder discharged from the hopper 100. More specifically, the main slitter unit 210 may include a slitter 211 and a slitter guide 212.

The slitter 211 may be arranged as a pair of two plates, as shown in FIGS. 3 to 5. The two plates of the slitter 211 may be separated from each other to provide a first passage space 10.

The slitter 211 may include a plurality of slitters. The slitter 211 may provide a second passage space 20 by positioning another slitter 211 on the side of the slitter 211 including the first passage space 10. In this case, one sides of the first passage space 10 and the second passage space 20 may be connected to each other. The other sides thereof may be arranged to be separated in different directions.

For example, the slitter 211 may be provided as a rectangular plate as shown in FIG. 3, which is cut vertically downward from an upper center and then to a lower corner. The two cut pieces of the slitter 211 may be separated from each other to provide the first passage space 10 including a vertical space 2 in a vertical direction and a transverse space 3 connected to the vertical space 2 and inclined in a transverse direction. Another slitter 211 is positioned on the side of the slitter 211 including the first passage space 10 to be coupled therewith such that they have different cutting directions. In this case, the second passage space 20 is formed by the additional slitter 211. When the plurality of slitters 211 are coupled with each other, the upper portions of the first passage space 10 and the second passage space 20 are connected to each other, and the lower portions of the first passage space 10 and the second passage space 20 at the corners are directed in different directions.

Meanwhile, the slitter 211 may be provided in various shapes, such as triangular or pentagonal.

In another example, the slitter 211 may be provided as a rectangular plate as shown in FIG. 4, which is cut from an upper center to a lower edge. The two cut pieces of the slitter 211 may be separated from each other to provide the first passage space 10 in the shape of a slanted "1" letter. Another slitter 211 is positioned on the side of the slitter 211 including the first passage space 10 to be coupled therewith such that they have different cutting directions. In this case, the second passage space 20 is formed by the additional slitter 211. When the plurality of slitters 211 are coupled with each other, the upper portions of the first passage space 10 and the second passage space 20 are connected to each other, and the lower portions of the first passage space 10 and the second passage space 20 at the corners are directed in different directions.

In another example, the slitter 211 may be provided as a rectangular sheet, as shown in FIG. 5, which is cut vertically downward from an upper center of the upper portion, then toward a lower corner, and then vertically downward to a lower end. The two cut pieces of the slitter 211 may be separated from each other to provide the first passage space 10 including a vertical space 2 located in the center of an upper portion, a transverse space 3 connected to the vertical space 2 and inclined in a transverse direction, and another vertical space 2 connected to the transverse space 3 and extended vertically downward. Another slitter 211 is positioned on the side of the slitter 211 including the first passage space 10 to be coupled therewith such that they have different cutting directions. In this case, the second passage space 20 is formed by the additional slitter 211. When the plurality of slitters 211 are coupled with each other, the upper portions of the first passage space 10 and the second passage space 20 are connected to each other, and the lower portions of the first passage space 10 and the second passage space 20 at the corners are directed in different directions.

In the slitter 211 described above, the upper portions of the first passage space 10 and the second passage space 20 are connected to each other. The powder discharged from the hopper 100 can be introduced into the upper portions of the first passage space 10 and the second passage space 20 to freely flow in the first passage space 10 and the second passage space 20. Eventually, the powder introduced into the upper portion of the slitter 211 is separated by the first passage space 10 and the second passage space 20 to be guided in different directions. The slitter 211 may include a plurality of slitters, and a proportion of the first passage space 10 or the second passage space 20 can be easily adjusted. For example, a total of ten slitters 211 can be combined to provide eight first passage spaces 10 and two second passage spaces 20. In this case, eight slitters 211 including the first passage space 10 may be combined consecutively, and two slitters 211 including the second passage space 20 may be combined consecutively on the side thereof.

The slitter guide 212 may be provided to cover the side of the slitter 211 so that powder can be moved into the first passage space 10 and the second passage space 20. More specifically, the slitter guide 212 may be provided as a plate. The slitter guide 212 may be coupled to the side of each of the slitters 211 located at both ends after the plurality of slitters 211 are coupled to each other. The slitter guide 212 prevents powder from escaping to the sides of the first passage space 10 and the second passage space 20 of the slitter 211.

The main slitter unit 210 described above receives powder introduced from the hopper 100 through its upper portion, and guides the introduced powder to be separated into the first passage space 10 and the second passage space 20 and discharged. In the main slitter unit 210, a separation ratio of the powder is determined depending on the number of the slitters 211 and the ratio of the first passage space 10 and the second passage space 20. For example, in the main slitter unit 210 provided by combining eight slitters 211 including the first passage space 10 and two slitters 211 including the second passage space 20, 80% of the powder is moved in the first passage space 10 and 20% of the powder is discharged from the second passage space 10.

The first main guide tube 220 is connected to one side of the main slitter unit 210 to guide the divided powder to be moved to the laser forming device 1. The first main guide tube 220 may be provided as a typical tube. One end of the first main guide tube 220 is connected to a lower side of the main slitter unit 210 where the first passage space 10 of the slitter 211 is located. The other end of the first main guide tube 220 is connected to the forming device 1. For example, in the main slitter unit 210 provided by combining eight slitters 211 including the first passage space 10 and two slitters 211 including the second passage space 20, the first main guide tube 220 is connected to the first passage space 10. That is, 80% of the powder discharged from the hopper 100 is moved to the forming device 1 through the first main guide tube 220.

The second main guide tube 230 is connected to the other side of the main slitter unit 210 to guide the remainder of the divided powder to the discharge monitoring unit 300. The second main guide tube 230 may be provided as a typical tube. One end of the second main guide tube 230 is connected to a lower side of the main slitter unit 210 where the second passage space 20 of the slitter 211 is located. The other end of the second main guide tube 230 is connected to the discharge monitoring unit 300. For example, in the main slitter unit 210 provided by combining eight slitters 211 including the first passage space 10 and two slitters 211 including the second passage space 20, the second main guide tube 230 is connected to the second passage space 20. That is, 20% of the powder discharged from the hopper 100 is moved to the discharge monitoring unit 300 through the second main guide tube 230.

The main sampling unit 200 allows a portion of the powder received from the hopper 100 to be supplied to the forming device 1, and the remaining powder to be supplied to the discharge monitoring unit 300. That is, the main sampling unit 200 can sample a portion of the powder supplied to the forming device 1.

The discharge monitoring unit 300 calculates an amount of the remaining powder separated from the main sampling unit 200. The discharge monitoring unit 300 may include a typical electrical capacitance tomography (ECT) sensor and an image analysis unit. The discharge monitoring unit 300 may be provided in the second main guide tube 230. The second main guide tube 230 can be sensed in real time, and the sensed image can be analyzed by the image analysis unit to calculate the amount of moved powder. For example, in the main slitter unit 210 provided by combining eight slitters 211 including the first passage space 10 and two slitters 211 including the second passage space 20, when the second main guide tube 230 is connected to the second passage space 20, the discharge monitoring unit 300 can manage whether the amount of moved powder greater or less than 20% based on the discharge amount of powder set in the hopper 100.

Meanwhile, the discharge monitoring unit 300 may be provided as a typical weight meter or a typical flow meter.

The powder supply management system for the laser forming device described with reference to the above embodiment can sample a portion of the powder supplied to the forming apparatus 1 from the hopper 100 through the main slitter unit 200 and determine presence or absence of a required amount through the discharge monitoring part 300, so that the powder supply management system for the laser forming device can enable an operator to manage the flow of powder supplied to the laser forming device 1 from the hopper 100 and determine the presence or absence of defective products.

Referring to another embodiment with reference to FIG. 6 or FIG. 7, the powder supply management system for a laser forming device may optionally further include a sub-sampling unit 400 that guides a portion of the powder discharged from the main sampling unit 200 to the monitoring unit 300, while guiding the remaining powder to the laser forming device 1. The sub-sampling unit 400 may broadly include a sub-slitter unit 410, a first sub-guide tube 420, and a second sub-guide tube 430. The sub-sampling unit 400 may be provided in the same configuration as the main sampling unit 200 described above.

Referring to FIG. 7, the sub-sampling unit 400 may have the same configuration as the main sampling unit 200 described above.

The sub-slitter unit 410 is connected to the main sampling unit 200 and divides the powder guided to the discharge monitoring unit 300. The sub-slitter unit 410 may be provided as the combination of the slitters 211 which is the same as that of the main slitter unit 210 described above.

The first sub-guide tube 420 may be provided in the same manner as the first main guide tube 220 described above. The first sub-guide tube 420 is connected to one side of the sub-slitter unit 410 to guide the divided powder to the laser forming device 1. For example, when the sub-slitter unit 410 is a combination of eight slitters 211 including the first passage space 10 and two slitters 211 including the second passage space 20, the first sub-guide tube 420 is connected to a lower side of the sub-slitter unit 410 where the first passage space 10 is located.

The second sub-guide tube 430 may be provided in the same manner as the second main guide tube 230 described above. The second sub-guide tube 430 is connected to the other side of the sub-slitter unit 410 and guides the remainder of the divided powder to the discharge monitoring unit 300. For example, when the sub-slitter unit 410 is a combination of eight slitters 211 including the first passage space 10 and two slitters 211 including the second passage space 20, the second sub-guide tube 430 is connected to a lower side of the sub-slitter unit 410 where the second passage space 20 is located.

The sub-sampling unit 400 separates the powder separated as a sample in the main sampling unit 200 once more to further reduce the amount of powder required for the calculation in the discharge monitoring unit 300.

Referring to FIG. 6, the powder supply management system for the laser forming device according to another embodiment may optionally further include a storage monitoring unit 500 for capturing an image of a state of the powder stored in the hopper 100. The storage monitoring unit 500 may include a typical electrical capacitance tomography (ECT) sensor and an image analysis unit. The storage monitoring unit 500 captures an image of the piled-up shape of the powder stored in the hopper 100. It is determined whether the powder in the hopper 100 is stored in a tilted state. When absence of the required amount is determined through the storage monitoring unit 500, it is possible for the operator to check the state of the powder stored in the hopper 100 through the discharge monitoring unit 300 so that the causative factor of the defect can be reduced.

Figure 8:
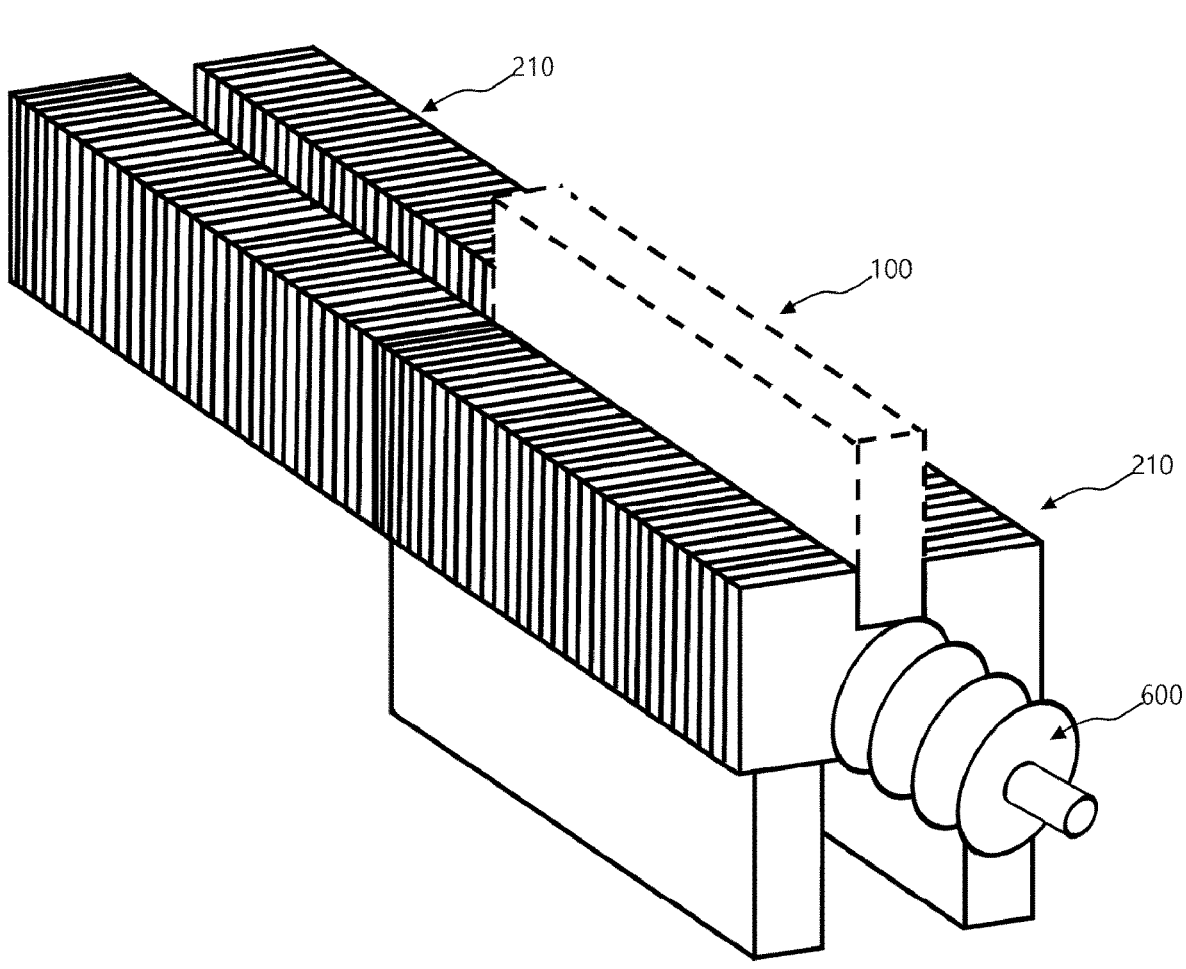
FIG. 8 is a view illustrating another embodiment disclosed in the present specification.

Meanwhile, referring to FIG. 8, in another embodiment, the main slitter unit 210 may be combined with another main slitter unit 210 having a different ratio of the first passage space 10 and the second passage space 20. In this case, a transfer unit 600 for moving the main slitter unit 210 may be further included. The transfer unit 600 moves the main slitter unit 210 so that the main slitter unit 210 to be connected to the hopper 100 can be selected. When all of the slitters 211 of the further combined main slitter unit 210 include the first passage space 10, various combinations such as not sampling or varying the amount of powder required for sampling may be made.

The transfer unit 600 may be provided as a typical air tube. The transfer unit 600 is coupled to the slitter 211 or the slitter guide 212. The transfer unit 600 expands and contracts depending on whether or not fluid or gas is introduced. Depending on the expansion and contraction of the transfer unit 600, the main slitter unit 210 or the further combined main slitter unit 210 is selectively connected to the hopper 100. Furthermore, the connection of the first main guide tube 220 and the second main guide tube 230 may also be selectively made. In addition, the sub-slitter unit 410 may also be configured as above to easily adjust the sampling rate. The transfer unit 600 configured as an air tube has an effect of suppressing malfunction when some of the powder, which is fine particle, is introduced into the transfer unit 600. That is, the problems in that devices moving forward/backward by means of gears or pistons increase possibility of abrasion and malfunction due to powder can be suppressed.

Meanwhile, the transfer units 600 may be provided in contact with the slitter 211 or the slitter guide 212 at both ends of the main slitter unit 210, respectively. In this case, the transfer units 600 may operate in such a way that when one expands, the other contracts.

The transfer unit 600 may be provided in the sub-slitter unit 410 in the same manner as described above.

Meanwhile, the main slitter unit 210 may include a rail passing through the slitters 211. The slitter guide 212 may be fixed to an end of the rail. The other side of the rail may include a pressing part that presses the slitter 211s. That is, after the operator inserts the necessary slitters 211 onto the rail as needed, when the pressing unit is operated, the main slitter unit 210 is pressurized and firmly fixed while the slitters 211 are moved toward the slitter guide 212 by the pressing unit. In this case, the pressing unit may be configured as the transfer unit 600.

Furthermore, a typical vibration element may be further included in the slitter unit 210 including the pressing unit and the rail. The vibration element may be provided on the rail. The vibration element is operated in a state in which the operation of the pressing unit is released. The slitter unit 210 including the vibration element vibrates the slitters 211 in a state in which the pressure is released so that a gap is generated between the slitters 211. That is, there is an effect of completely removing powder or the like caught between the slitters 211 through the gap generated by the vibrating element.

Meanwhile, the vibration element may operate in a state where the slitter unit 210 is pressurized.

Meanwhile, the slitter unit 210 may further include a plate body without a passage space between the slitter 211 and the other slitter 211 to provide the main slitter unit 210 or the sub slitter unit 410.

From the foregoing, it will be understood that various embodiments of the present disclosure have been described for illustrative purposes, and that there are various modifications possible without departing from the scope and idea of the present disclosure. Further, the various embodiments described above are not intended to limit the idea of the present disclosure, and the true idea and scope of the present disclosure will be presented from the following claims.

The invention claimed is:

1. A powder supply management system for a laser forming device, comprising:
   a hopper for discharging powder;
   a first powder dividing unit connected to the hopper and configured to divide the powder discharged from the hopper into a first portion and a second portion; and
   a discharge monitoring unit configured to calculate an amount of the second portion of the powder divided in the first powder dividing unit,
   wherein the first powder dividing unit includes:
      a plurality of first slitters disposed side-by-side to define a first passage space having a first inlet connected to the hopper and a first outlet;
      at least one second slitter laterally adjacent to the first slitters to define a second passage space having a second inlet connected to the hopper and a second outlet;
      a first slitter guide covering side surfaces of outermost ones of the first slitters and the second slitter;

a first guide tube connected to the first outlet and configured to guide the first portion of the powder in the first passage space toward the laser forming device; and
   a second guide tube connected to the second outlet and configured to guide the second portion of the powder in the second passage space toward the discharge monitoring unit,
   wherein the first inlet and the second inlet are connected to each other such that the powder discharged from the hopper is able to enter both the first passage space and the second passage space, and
   wherein the first outlet and the second outlet are separated from each other in different discharge directions such that the first passage space and the second passage space are configured to guide the powder in different discharge directions.

2. The powder supply management system of claim 1, further comprising a second powder dividing unit connected to the second guide tube,
   wherein the second powder dividing unit is configured to:
   divide the second portion of the powder discharged through the second guide tube into a third portion and a fourth portion, and
   guide the third portion of the powder to the discharge monitoring unit and the fourth portion of the powder to the laser forming device.

3. The powder supply management system of claim 2, wherein the second powder dividing unit includes:
   a plurality of third slitters disposed side-by-side to define a third passage space having a third inlet connected to the second guide tube and a third outlet;
   at least one fourth slitter laterally adjacent to the third slitters to define a fourth passage space having a fourth inlet connected to the second guide tube and a fourth outlet;
   a second slitter guide covering side surfaces of outermost ones of the third slitters and the fourth slitter;
   a third guide tube connected to the third outlet and configured to guide the third portion of the powder in the third passage space toward the laser forming device; and
   a fourth guide tube connected to the fourth outlet and configured to guide the fourth portion of the powder in the fourth passage space toward the discharge monitoring unit,
   wherein the third inlet and the fourth inlet are connected to each other such that the second portion of the powder discharged through the second guide tube is able to enter both the third passage space and the fourth passage space, and
   wherein the third outlet and the fourth outlet are separated from each other in different discharge directions such that the third passage space and the fourth passage space are configured to guide the second portion of the powder in different discharge directions.

4. The powder supply management system of claim 1, further comprising a storage monitoring unit configured to capture an image of a state of the powder stored in the hopper.

5. The powder supply management system of claim 1, wherein the first passage space and the second passage space respectively include:
   a vertical space in a vertical direction; and a transverse space connected to the vertical space and inclined in a transverse direction.

\* \* \* \* \*